(No Model.)
S. W. BABBITT.
CHEESE HOLDER.
No. 453,571.　　　　　　　　　Patented June 2, 1891.
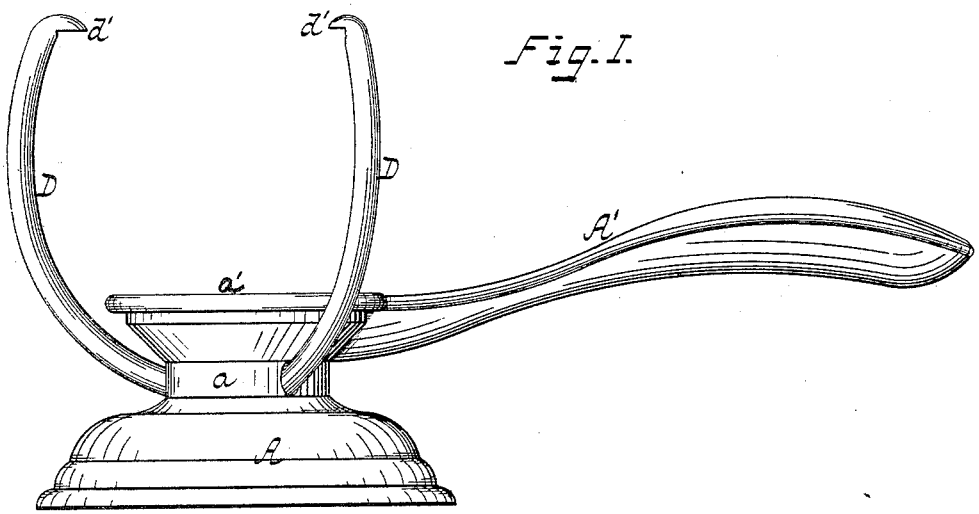
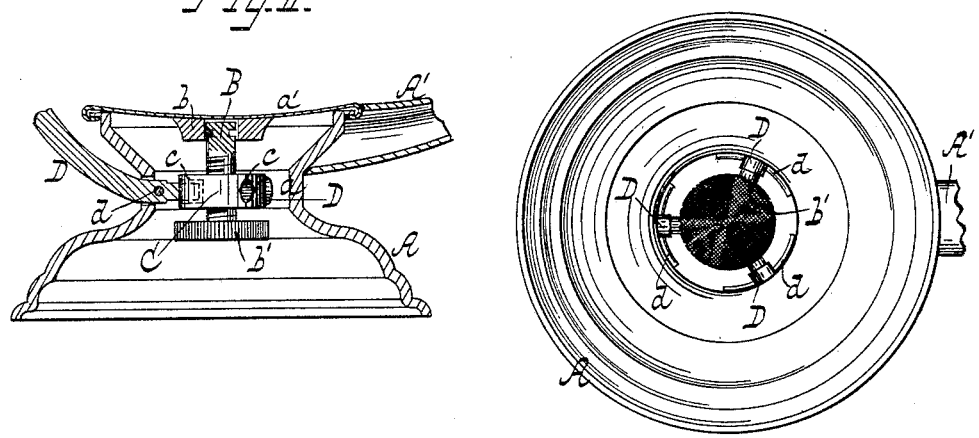
Witnesses　　　　　　　　　　　　　Inventor
A. V. Cushman　　　　　　　　　Seth W. Babbitt
Chas. Wahlers　　　　　By his Attorney
　　　　　　　　　　　　　Arthur W. Harrison

United States Patent Office.

SETH WILLIAM BABBITT, OF MERIDEN, CONNECTICUT, ASSIGNOR TO THE WILCOX SILVER PLATE COMPANY, OF SAME PLACE.

CHEESE-HOLDER.

SPECIFICATION forming part of Letters Patent No. 453,571, dated June 2, 1891.

Application filed April 24, 1890. Serial No. 349,319. (No model.)

*To all whom it may concern:*

Be it known that I, SETH WILLIAM BABBITT, of Meriden, in the county of New Haven and State of Connecticut, have invented new and useful Improvements in Cheese-Holders; and I do hereby declare the following to be a full, clear, and exact description of said invention, reference being had to the accompanying drawings, and to the letters of reference marked thereon, which form a part of this specification.

My invention relates to improvements in table articles designed to receive and securely hold cheeses of the kind particularly known as "Edam" and "Pine-Apple." Cheeses of this kind are generally placed whole upon a table and served on an ordinary dish or platter, the cheese having a portion of its shell at the top cut out. To remove some of the cheese when so served usually necessitates the holding the shell of the cheese with one hand while some of the contents are being taken out with a scoop or spoon, and the shell is so greasy that the hand becomes soiled.

To remove this objection and to provide an ornamental as well as useful article of table-furniture is the object of my invention; and it consists in the construction and combination of parts, as hereinafter described, and pointed out in the claims.

In the drawings which accompany and form a part of this specification, Figure I is a side elevation of my improved cheese-holder. Fig. II is a vertical sectional view of the main portion thereof, and Fig. III is a bottom plan view.

Similar letters of reference indicate corresponding parts in the several views.

A is the base, having a contracted portion or neck $a$, handle A', and top $a'$, on which the cheese is to rest. On the under side of top $a'$ is a recessed nipple $b$, which receives the upper end of a screw B, and a pin projecting from the nipple and into an annular groove in screw B serves to hold said screw in position, while yet allowing said screw to be freely turned by its milled head $b'$. On the screw B is a nut C, having a plurality of drilled holes $c$, preferably three, to receive the inner or lower ends of as many clamping-arms D, which are pivoted on fulcrums $d$ at the neck $a$ of the base, and which pass outward through openings in said neck and extend upwardly and are curved and have inwardly-turned upper ends $d'$ to "bite" into the shell of a cheese. The lower inner ends of the clamping-arms are smaller than the holes $c$, which receive them, in order to allow the free working of the parts.

To secure a cheese firmly in place it is only necessary to place it on the top $a'$ of the base, the clamping-arms being sufficiently spread for the purpose, and then turn the screw B to the right by means of its head $b'$. This draws downward the nut C, and with it the inner ends of the arms D, and results in forcing the upper ends $d'$ closely against or into the shell of the cheese, so as to tightly clamp it. The holder and cheese can then be moved from place to place or passed around the table by means of the handle A', and the contents of the shell can be readily removed without chance of greasing or otherwise soiling the hands.

Having now described my invention, what I claim, and desire to secure by Letters Patent, is—

1. In a cheese-holder, the combination, with a base and a top plate suitably connected together and having a handle, of a plurality of arms supported by horizontal pivots located below said top plate, the lower and inner ends of said arms extending in a substantially horizontal plane under said plate, and means for simultaneously raising or lowering said inner ends, substantially as described.

2. In a cheese-holder, the combination, with a hollow base or stand therefor, of a plurality of arms pivoted thereto on horizontal pivots and having their shorter ends extending inside the base and their longer ends curved upwardly above the base, a vertically-arranged screw inside the base, and means whereby rotation of said screw will cause the upper ends of the arms to move in a radial direction to clamp a cheese, substantially as described.

3. The combination, with the base A, having neck $a$, top $a'$, and a handle, of the clamping-arms D, having their lower ends passed through openings in the neck and pivoted on horizontal fulcrums $d$, and a vertically-arranged screw located inside the neck for simultaneously operating all of said arms, substantially as described.

4. In a cheese-holder, the combination, with a base, of a vertically-arranged screw fitted thereto so as to turn freely but have no longitudinal movement, a nut fitted to said screw and having a plurality of holes, and a corresponding number of clamping-arms pivoted to the base and having their inner ends entering said holes, substantially as described.

5. In a cheese-holder, the combination of base A, having the under side of its top provided with the recessed nipple $b$, the screw B, annularly channeled at its upper end and having a fixed pin entering said channel, the nut C, having drilled holes $c$, and the clamping-arms D, pivoted to the base at $d$ and having their lower ends entering said holes, substantially as described.

In testimony whereof I affix my signature in presence of two subscribing witnesses.

SETH WILLIAM BABBITT.

Witnesses:
H. B. BEACH,
MELVILLE BROOKS.